Jan. 19, 1937.  D. C. SIMPSON  2,068,203
METHOD AND APPARATUS FOR MANUFACTURING AND FABRICATING GLASS WOOL
Original Filed Oct. 27, 1933   3 Sheets-Sheet 1
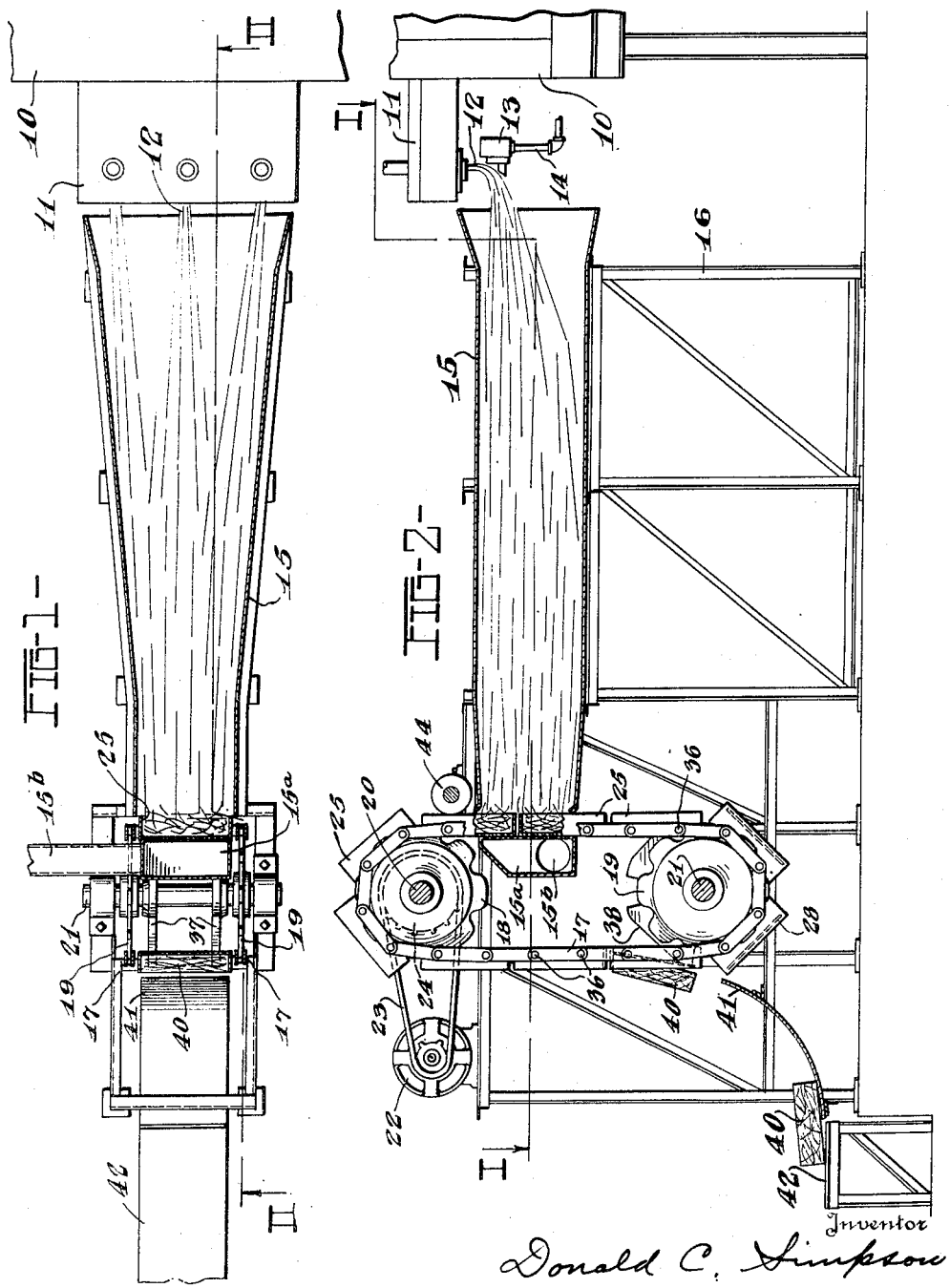
Inventor
Donald C. Simpson
By J. F. Rule
Attorney

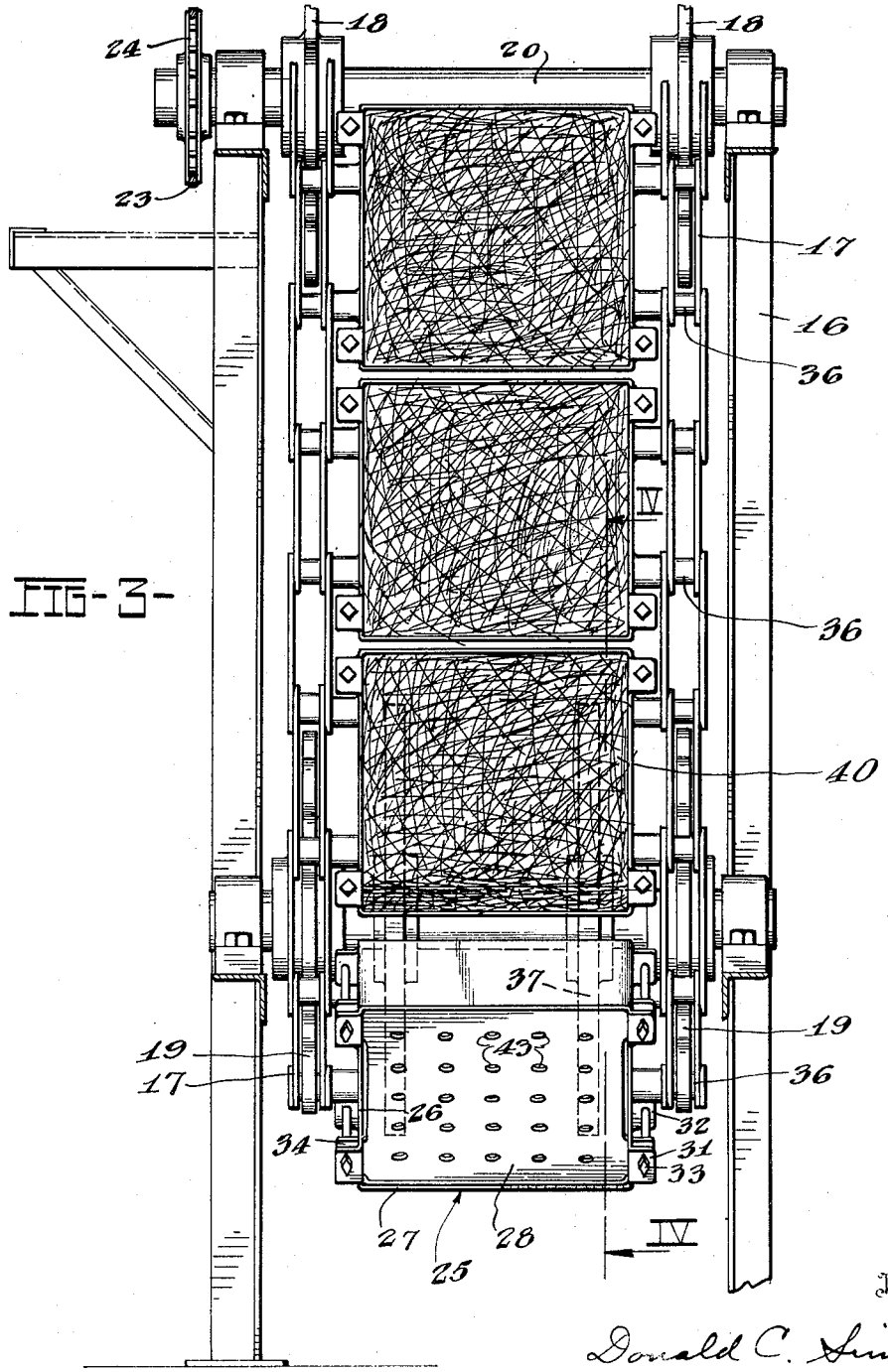

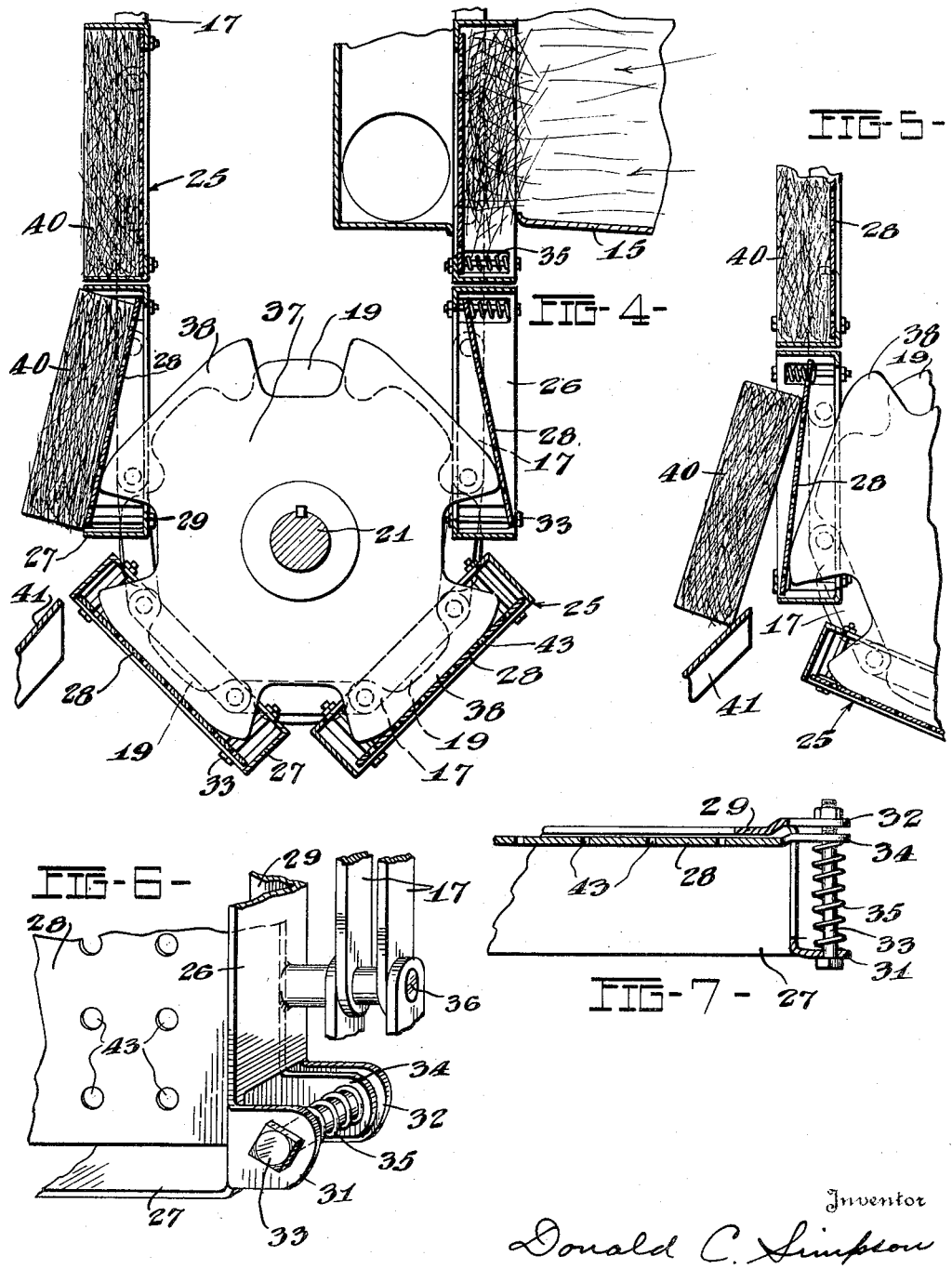

Patented Jan. 19, 1937

2,068,203

UNITED STATES PATENT OFFICE 2,068,203

METHOD AND APPARATUS FOR MANUFACTURING AND FABRICATING GLASS WOOL

Donald C. Simpson, Newark, Ohio, assignor to Owens-Illinois Glass Company, a corporation of Ohio Application October 27, 1933, Serial No. 695,432
Renewed March 25, 1936

20 Claims. (Cl. 154—28)

My invention relates to methods and apparatus for manufacturing wool from glass or other materials and fabricating the wool into articles of predetermined size and shape.

An object of my invention is to provide an apparatus by which molten glass or the like may be reduced to the form of wool and as it is formed, introduced directly into suitable containers in which it is fabricated into bats or other articles of predetermined size and shape.

A further object of the invention is to provide mechanism by which such articles are automatically formed by a continuous process and automatically discharged from the forming apparatus.

Other objects of the invention will appear hereinafter.

In the accompanying drawings:

Fig. 1 is a sectional plan view of an apparatus constructed in accordance with my invention, adapted for making glass wool bats or the like, the section being taken at the line I—I on Fig. 2.

Fig. 2 is a sectional elevation of the apparatus, the section being taken at the line II—II on Fig. 1.

Fig. 3 is an end elevation of the apparatus on a larger scale.

Fig. 4 is a fragmentary sectional elevation at the line IV—IV on Fig. 3, showing the lower portion of the endless conveyor and associated mechanism.

Fig. 5 is a similar view showing the conveyor in a somewhat more advanced position, illustrating the method of discharging a bat from the conveyor.

Fig. 6 is a fragmentary perspective view showing details of a container.

Fig. 7 is a fragmentary sectional view of the same.

Referring to Figs. 1 and 2, molten glass or like material is supplied from a tank furnace 10 having a forehearth extension 11 with a bottom outlet or outlets through which the molten glass flows in a continuous stream or streams 12. The molten material is reduced to the form of wool by means of blowers 13 which may be of conventional or approved construction. Steam or other gas under pressure is supplied through pipes 14 to the blowers. Each blower directs a blast of steam or other gas against a stream of glass, thereby drawing it out into fine threads or filaments which are carried through a conduit 15 by the force of the blast. The conduit, as shown, is mounted on a framework 16 and is horizontally disposed with its inner end adjacent the blowers 13.

Mounted on the framework 16 at the outer end of the conduit is an endless chain conveyor comprising sprocket chains 17 running over upper and lower sprocket wheels 18 and 19 mounted respectively on shafts 20 and 21. An electric motor 22 has a driving connection including a sprocket chain 23 and sprocket wheel 24, with the drive shaft 20 for driving the conveyor continuously.

The conveyor comprises a series of rectangular containers 25 placed end to end, said containers being mounted between the sprocket chains 17 in a manner to be presently described. These containers may be made of sheet metal. Each container, as shown, comprises sides 26, ends 27 and a bottom 28. The sides and ends may be made of a single piece of sheet material bent to rectangular form. The sides have flange portions 29 turned inward to form marginal supports for the bottom 28. The bottoms are yieldingly mounted to permit them to be moved outwardly for the purpose of discharging the wool bats formed within the containers, in a manner hereinafter described.

Referring to Figs. 6 and 7, the side members 26 are formed with out-turned lugs 31 and 32 at the corners of the frame, in which lugs are mounted bolts 33. The bottom 28 is formed with lugs 34 which extend outwardly between the lugs 31 and 32, said lugs 34 being slidably mounted on the bolts 33. Mounted on each bolt 33 is a coil spring 35 interposed between the lug 31 and the lug 34, said springs normally holding the bottoms 28 yieldingly downward against the supporting flanges 29.

The side members 26 of the containers are provided with studs 36 secured thereto and projecting outward therefrom adjacent the corners of the containers. The chains 17 are composed of pairs of links mounted on said studs.

Mounted on the lower shaft 21 between the sprocket wheels 19 are cam plates 37 each formed with lifting cams or surfaces 38 which engage the bottoms 28 of the receptacles as the latter are carried around the lower sprockets, and serve to project said bottoms outward, as indicated in Figs. 4 and 5, for discharging the pads 40 from the containers. Thus, as shown in Fig. 4, one of the cams 38 has engaged the bottom 28 of a container which is moving downward around the sprocket shaft 21. In this manner, said bottom is projected outward so that the lower end of the pad 40 is freed from the end of the flange 27 of the container, permitting the pad 40 to slide downward off said bottom.

Fig. 5 shows the parts advanced a short distance beyond the position shown in Fig. 4, the bat 40 having begun its descent away from the container 25, the lower end of the bat being in contact with a stationary inclined chute or guide 41, (see also Fig. 2), down which the bat slides onto a support 42. The springs 35 which are placed under compression by the outward movement of the bottom 28, return the bottom to its normal position when the empty container passes upward beyond the sprockets 19.

As the containers 25 move upward they are carried across the outer end of the conduit 15 and are filled with the glass wool which is being continuously discharged from the conduit. The force of the steam from the blower 13 is sufficient to pack the wool within the containers. The bottoms 28 of the containers are formed with a multiplicity of openings 43 to permit the passage of the steam into a chamber 15ª which may be considered as an extension of the conduit 15, and from thence through the exhaust pipe 15ᵇ. If desired, suction may be applied through the exhaust pipe. As each container with its quota of wool packed therein moves upward beyond the conduit 15, it passes a cut-off roll 44 which runs over the outer edges of the sides and ends of the containers, thereby trimming off any wool which projects over said edges and smoothing the outer surface of the wool bat.

If desired, the wool may be sprayed or treated with a binding material, as, for example, latex, before or during its passage through the conduit 15. Evidently the wool might be treated with other materials, depending upon the particular results desired and the purposes for which the wool bats or wool articles are to be used.

Modifications may be resorted to within the spirit and scope of my invention.

I claim:

1. The method of producing articles of predetermined size and shape consisting of matted fibrous material, which comprises directing a blast of gas against a supply of said material while the latter is in a liquid or semiliquid condition and thereby drawing the material out into threads or filaments, enclosing said material in a conduit through which the material is blown during said drawing operation, causing the filaments to solidify while being carried with the blast through the conduit, causing a series of containers to move in succession across the conduit and causing the blast to extend from the conduit through each container as it moves across the conduit while arresting the material as it enters the container and thereby causing the material to accumulate in matted form within the containers, forming mats of predetermined size and shape, and removing the mats thus formed from the containers.

2. The method which comprises flowing a stream of molten material, applying a blast of gas to the said stream and thereby blowing the material into fine threads or filaments, carrying said filaments by the force of the blast through a conduit and causing them to solidify during their passage through the conduit, and passing a series of molding receptacles in succession across the end of the conduit, causing the blast to extend from the conduit through each receptacle in succession as the receptacle passes across the conduit, thereby causing the material to accumulate within said receptacles and form articles of predetermined size and shape.

3. Apparatus for forming articles of matted wool of predetermined size and shape, comprising, in combination, means for flowing a stream of liquefied material, means for applying a blast of gas thereto and thereby drawing the material into filaments, a conduit through which the material is conveyed by the blast, a shaping receptacle, means for causing said receptacle to pass across the outer or discharge end of the conduit, and means for causing the blast to extend from the conduit through the receptacle while the latter is passing across the conduit and thereby causing the material to accumulate in the receptacle in matted form and produce an article of predetermined size and shape.

4. Apparatus for forming articles of matted wool of predetermined size and shape, comprising, in combination, means for flowing a stream of liquefied material, means for applying a blast of gas thereto and thereby drawing the material into filaments, a conduit through which the material is conveyed by the blast, a shaping receptacle, means for causing said receptacle to pass across the outer or discharge end of the conduit, and means for causing the blast to extend from the conduit through the receptacle while the latter is passing across the conduit and thereby causing the material to accumulate in the receptacle in matted form and thereby produce an article of predetermined size and shape, said receptacle comprising a foraminous bottom permitting passage of said gas therethrough as the material accumulates within the receptacle.

5. Apparatus for forming articles of matted wool of predetermined size and shape, comprising, in combination, means for flowing a stream of liquefied material, means for applying a blast of gas thereto and thereby drawing the material into filaments, a conduit through which the material is conveyed by the blast, an endless conveyor, a series of receptacles carried thereby, means for driving the conveyor and causing said receptacles to pass in succession across the discharge end of the conduit, said receptacles being shaped and arranged to form a continuation of the conduit as they pass across said end thereof, and means for causing the blast to extend from the conduit through each receptacle in succession as it passes the conduit and thereby cause the material as it is discharged from the conduit, to accumulate within said receptacles and produce formed masses or bats of wool within the receptacles.

6. Apparatus for forming articles of matted wool of predetermined size and shape, comprising, in combination, means for flowing a stream of liquefied material, means for applying a blast of gas thereto and thereby drawing the material into filaments, a conduit through which the material is conveyed by the blast, an endless conveyor, a series of receptacles carried thereby, means for driving the conveyor and causing said receptacles to pass in succession across the discharge end of the conduit, said receptacles being shaped and arranged to form a continuation of the conduit as they pass across said end thereof, means for causing the blast to extend from the conduit through each receptacle in succession as it passes the conduit and thereby cause the material as it is discharged from the conduit, to accumulate within said receptacles and produce formed masses or bats of wool within the receptacles, and automatic means for discharging said articles from the receptacles.

7. The combination of a conduit, means for directing a blast of gas through the conduit and causing it to blow fibrous material through the conduit, a series of receptacles, and automatic means for passing the receptacles in succession across the discharge end of the conduit and causing a quota of the material to be blown from the conduit directly into each receptacle and accumulate therein, thereby forming wool bats of predetermined size and shape, said receptacles being formed with openings permitting the blast of gas to pass through the walls of the receptacles while said material accumulates therein.

8. The combination of a conduit, means for directing a blast of gas through the conduit and causing it to blow fibrous material through the conduit, a series of receptacles, and automatic means for passing the receptacles in succession across the discharge end of the conduit and causing a quota of the material to be blown from the conduit directly into each receptacle and accumulate therein, thereby forming wool bats of predetermined size and shape, each said receptacle comprising a foraminous bottom permitting the free passage therethrough of the gas from the conduit, whereby the material is compacted within the receptacles by the force of the gas.

9. The combination of parallel shafts, sprocket wheels on each shaft, the wheels on one shaft being spaced from those on the other shaft in a direction transverse to said shafts, an endless chain conveyor running over said wheels, an endless series of receptacles carried by said conveyor, means for driving said wheels and conveyor, means for introducing material into the traveling receptacles while the latter are at a point intermediate the wheels on the two shafts and thereby forming articles of a size and shape corresponding to those of the receptacles, each said receptacle comprising a bottom movable outwardly relative to the sides of the receptacle, automatic means for moving the bottoms outward in succession and thereby ejecting the formed articles from the receptacles, and springs arranged to yieldingly hold said bottoms in their inward position and to return them after said outward movement.

10. The combination of parallel shafts, sprocket wheels on each shaft, the wheels on one shaft being spaced from those on the other shaft in a direction transverse to said shafts, an endless chain conveyor running over said wheels, an endless series of receptacles carried by said conveyor, means for driving said wheels and conveyor, means for introducing material into the traveling receptacles while the latter are at a point intermediate the wheels on the two shafts and thereby forming articles of a size and shape corresponding to those of the receptacles, each said receptacle comprising a bottom movable outwardly relative to the sides of the receptacle, cam devices rotatable with one said shaft and operable to engage said bottoms in succession and move them outward, whereby the articles are projected into position to be discharged from the receptacles, and springs arranged to yieldingly hold said bottoms in their inward position and to return them after said outward movement.

11. The combination of receptacles arranged in an endless series, links connecting the receptacles and forming therewith an endless conveyor, each said receptacle comprising a bottom and surrounding side walls, said bottom being movable outwardly along said walls for ejecting material from the conveyor, springs means yieldingly opposing said outward movement and operable to return the bottom after it has been moved outward, means for guiding and driving the conveyor in a closed path, means for introducing material into the receptacles in succession and molding it therein, and automatic means for effecting said movements of the said bottoms and thereby discharging the molded material from the receptacles.

12. The combination of receptacles, each comprising a bottom and surrounding side walls, said receptacles being arranged in an endless series, links connecting the receptacles and forming an endless conveyor, sprocket wheels over which the conveyor is trained, said sprocket wheels being mounted to rotate about parallel axes and spaced apart in a direction transverse to said axes, means for driving one of said sprockets and thereby causing the conveyor to travel in a closed path, means for feeding fibrous material to the receptacles in succession and molding the material therein, automatic means for moving the said bottoms outwardly through the surrounding side walls and thereby discharging the molded material, spring means yieldingly opposing said outward movement of said bottoms and operable to return them after said outward movement.

13. The combination of receptacles, each comprising a bottom and surrounding side walls, said receptacles being arranged in an endless series, links connecting the receptacles and forming an endless conveyor, sprocket wheels over which the conveyor is trained, said sprocket wheels being mounted to rotate about parallel axes and spaced apart in a direction transverse to said axes, means for driving one of said sprockets and thereby causing the conveyor to travel in a closed path, means for feeding fibrous material to the receptacles in succession and molding the material therein, the bottom of each receptacle being movable outwardly relative to the surrounding side walls, cams rotating with one of said sprocket wheels and operable to move the said bottoms outwardly in succession as they pass over said sprocket wheel and thereby eject the molded material from the receptacles, spring means yieldingly opposing said outward movement of said bottoms and operable to return them after said outward movement.

14. The combination of an endless conveyor comprising an endless series of receptacles, each said receptacle comprising a bottom and a surrounding frame, springs for yieldingly holding said bottoms in normal position within the surrounding frames, sprocket wheels over which said conveyor is trained, said sprocket wheels being mounted to rotate about parallel axes spaced apart in a direction transverse to said axes, means for driving one of said sprocket wheels and thereby causing the conveyor to travel in a closed path and causing each receptacle to pass over the sprocket wheels, and cams rotatable with one of said sprocket wheels in the path of said bottoms and operable to move each said bottom outwardly against the tension of its holding springs.

15. The combination of an endless conveyor comprising an endless series of receptacles, each said receptacle comprising a bottom and a surrounding frame, springs for yieldingly holding said bottoms in normal position within the surrounding frames, sprocket wheels over which said conveyor is trained, said sprocket wheels being mounted to rotate about parallel axes spaced apart in a direction transverse to said axes, means for driving one of said sprocket wheels and thereby causing the conveyor to travel in a closed path and causing each receptacle to pass over the sprocket wheels, means for feeding fibrous material into said receptacles at a station intermediate the sprocket wheels and forming molded articles within the receptacles, and cams carried with one of said sprocket wheels and operable to project said bottoms as the receptacles pass over the sprocket wheel and thereby eject the molded articles from the receptacle.

16. The combination of parallel horizontal shafts spaced vertically, sprocket wheels on each shaft, the wheels on one shaft being spaced vertically above those on the other shaft, an endless chain conveyor running over said wheels, an endless series of receptacles carried by the conveyor, means for driving said wheels and conveyor, means for introducing material into the traveling receptacles and thereby forming articles of a size and shape corresponding to those of the receptacles, each of said receptacles comprising a bottom movable outwardly relative to the sides of the receptacle, and automatic means operable during the downward travel of each receptacle to swing the lower end of its said bottom outward relative to the sides of the receptacle so that the article clears the lower side of the receptacle and is free to slide downward by gravity off said bottom.

17. The combination of parallel horizontal shafts spaced vertically, sprocket wheels on each shaft, the wheels on one shaft being spaced vertically above those on the other shaft, an endless chain conveyor running over said wheels, an endless series of receptacles carried by the conveyor, means for driving said wheels and conveyor, means for introducing material into the traveling receptacles and thereby forming articles of a size and shape corresponding to those of the receptacles, each of said receptacles comprising a bottom movable outwardly relative to the sides of the receptacle, and cam means rotating with the lower sprocket wheels and operable to engage each said bottom during its descent and swing the lower end thereof outward to a position to free the article from the lower end wall of its receptacle and thereby permit the article to be discharged by gravity.

18. The method which comprises introducing fibers into a blast of gas, carrying the fibers by the force of the blast through a conduit, passing a series of molding receptacles in succession across the end of the conduit, and causing the blast to extend from the conduit through each receptacle in succession as the receptacle passes across the conduit, thereby causing the fibers to accumulate within said receptacles and form articles of predetermined size and shape.

19. The method which comprises enveloping loose fibers in a blast of gas, passing a series of molding receptacles in succession across the path of said blast, and causing said blast to be projected through each receptacle in succession as the receptacle passes across said path, thereby causing the fibers to accumulate within the receptacles and be molded therein to form articles of predetermined size and shape.

20. Apparatus for forming molded articles of predetermined shape consisting of matted fibers, comprising, in combination, means for enveloping loose fibers in a blast of gas, means for confining the blast to a predetermined path, a molding receptacle, means for causing said receptacle to move across said path, and means for causing said blast to continue through said receptacle while the fibers accumulate and are molded in the receptacle, thereby producing an article of predetermined size and shape.

DONALD C. SIMPSON.